United States Patent [19]

Funahashi et al.

[11] Patent Number: 4,522,885

[45] Date of Patent: Jun. 11, 1985

[54] MAGNETIC RECORDING MEDIUM

[75] Inventors: Masaya Funahashi, Osaka; Kenichi Inoue, Muko; Kunio Mizushima, Toride, all of Japan

[73] Assignee: Hitachi Maxell, Ltd., Osaka, Japan

[21] Appl. No.: 579,169

[22] Filed: Feb. 10, 1984

[30] Foreign Application Priority Data

Feb. 12, 1983 [JP] Japan .................................. 58-21935
Feb. 19, 1983 [JP] Japan .................................. 58-26693
Feb. 19, 1983 [JP] Japan .................................. 58-26694

[51] Int. Cl.$^3$ ............................ G11B 5/70; G11B 5/82
[52] U.S. Cl. .................................. 428/422; 252/62.54; 360/134; 360/135; 360/136; 427/128; 427/131; 428/64; 428/63; 428/411; 428/447; 428/500; 428/497; 428/695; 428/694; 428/900
[58] Field of Search .............. 428/695, 422, 900, 694, 428/447, 500, 497, 411, 641, 65; 427/128, 131; 252/62.54; 360/134–136

[56] References Cited

U.S. PATENT DOCUMENTS

| 3,490,946 | 1/1970 | Wolff | 428/422 |
| 3,492,235 | 1/1970 | Matsumoto | 252/62.54 |
| 3,993,824 | 11/1976 | Shirahata | 428/900 |
| 4,096,079 | 6/1978 | Pardee | 428/64 |
| 4,232,072 | 11/1980 | Pardee | 428/900 |
| 4,390,601 | 6/1983 | Ono | 428/480 |
| 4,409,300 | 10/1983 | Ohkawa | 428/695 |
| 4,431,702 | 2/1984 | Kawahara | 428/900 |

FOREIGN PATENT DOCUMENTS 0124708 9/1979 Japan .................................. 428/695

Primary Examiner—Ellis P. Robinson
Attorney, Agent, or Firm—Birch, Stewart, Kolasch & Birch

[57] ABSTRACT

A magnetic recording medium which comprises a substrate and a magnetic layer comprising magnetic powder and a resinous binder formed on the substrate, characterized in that the magnetic layer further comprises a lubricant and an unsaturated fatty acid ester, which is improved in durability.

12 Claims, No Drawings

MAGNETIC RECORDING MEDIUM

This invention relates to a magnetic recording medium improved in durability.

In magnetic recording media such as magnetic disks, magnetic tapes and magnetic sheets prepared by applying a magnetic coating composition comprising magnetic powder, a resinous binder and an organic solvent onto a substrate to make a magnetic layer, the magnetic layer is apt to be worn away due to its contact with a magnetic head as well as a pad under a large velocity at recording and reproducing. Thus, development of a magnetic recording medium excellent in wear-resistance and durability has been highly desired.

For this purpose, it has already been proposed to incorporate into the magnetic layer a variety of lubricants such as hydrocarbons (e.g. squalane, liquid paraffin), silicone compounds (e.g. silicone oil) and fluorinated compounds (e.g. trichlorofluoroethylene) [U.S. Pat. Nos. 4,223,361 and 4,349,608]. It has also been proposed to use saturated fatty acid esters in order to impart an enhanced lubricity of the magnetic layer [U.S. Pat. No. 4,322,474]. The incorporation of said conventional lubricants can surely improve the wear-resistance to a certain extent. However, those conventional lubricants cause the pad to stain seriously. On the other hand, saturated fatty acid esters can not maintain the lubricity over a sufficiently long period of time.

As the result of an extensive study for overcoming said drawbacks, it has now been found that the incorporation of a conventional lubricant in combination with an unsaturated fatty acid ester into the magnetic layer is highly effective in improvement of the wear-resistance so that the durability of magnetic recording medium is much enhanced. Advantageously, the stain of the pad is not produced for a satisfactorily long period of time.

The reason why said technical effect can be achieved has not been clarified yet. However, it may be assumed that an unsaturated fatty acid ester generally has a lower melting point and remains flowable over a wide temperature range in comparison with a saturated fatty acid ester, and the unsaturated fatty acid at a flowable state is combined with a conventional lubricant to make a non-separable liquid mixture, which would exhibit an excellent lubricity over the magnetic layer.

Accordingly, a main object of the present invention is to provide a magnetic recording medium comprising a substrate and a magnetic layer comprising magnetic powder and a resinous binder formed thereon, characterized in that the magnetic layer further comprises at least one of the lubricants chosen from hydrocarbons, silicone compounds and fluorinated compounds and at least one of unsaturated fatty acid esters.

As the hydrocarbon, there may be employed any one in a liquid form at room temperature. Preferred examples are liquid paraffin, natural squalane, natural squalene, synthetic squalane, synthetic squalene, olefin-polymerized oil, etc. Examples of the silicone compound are dimethyl silicone oil, methyl phenyl silicone oil, fluorosilicone oil, etc. As the fluorinated compound, there may be exemplified tetrafluoroethylene, hexafluoropropylene, trichlorofluroethylene, perfluoroalkyl polyether, fluorinated alkyl esters, etc. Commercially available fluorinated compound lubricants such as "Daifloil #20" (manufactured by Daikin Kogyo Co., Ltd.) and "Krytox" (manufactured by E. I. Du Pont de Nemours & Company Inc.), etc. are preferably employed.

The unsaturated fatty acid ester is less volatile due to its unsaturated double bond, exhibits a remarkable lubricity and is well compatible with any of the lubricants as used. Examples of the unsaturated fatty acid ester are oleic esters, elaidic esters, linoleic esters, linolenic esters, etc. Among them, their alkyl or alkenyl esters such as oleyl oleate and n-butyl oleate are preferred.

When the lubricant is employed together with the unsaturated fatty acid ester, the synergistically enhanced lubricating performance is exerted so that the wear-resistance of the magnetic layer is remarkably increased and produced over a long period of time. Advantageously, the drawbacks as seen in their sole use are eliminated. For instance, staining of the pad is no longer produced. Further, variations in head pressure and also in durability can be prevented.

The weight ratio of the lubricant(s) and the unsaturated fatty acid ester(s) may be within a range of 99:1 to 1:99, preferably of 50:50 to 99:1 to 50:50. When the amount of the unsaturated fatty acid ester(s) is less than the lower limit, the wear-resistance of the magnetic layer to the pad may be insufficient. When the amount is more than the upper limit, the wear-resistance to the head will be unsatisfactory, particularly when the head pressure is high.

The combined amount of the lubricant(s) and the unsaturated fatty acid ester(s) may be usually from 0.1 to 40% by weight, preferably from 0.1 to 20% by weight, more preferably from 0.5 to 10% by weight, to the weight of the magnetic powder. When the amount is less than the lower limit, no desired effect can be produced; when the amount is more than the upper limit, bleeding out occurs so that the head is stained and the output is lowered.

For preparation of a magnetic coating composition, the lubricant(s) and the unsaturated fatty acid ester(s) may be dissolved in an appropriate solvent or solvent mixture (e.g. n-hexane, methanol, ethanol, isopropanol, freon) to make a solution and magnetic powder such as metallic iron, metallic cobalt, iron or cobalt alloy, gamma-$Fe_2O_3$, $Fe_3O_4$, intermediary oxide of iron or cobalt or its cobalt-modified product or barium ferrite and a resinous binder such as vinyl chloride resin, vinyl acetate resin, vinyl chloride/vinyl acetate copolymer, vinyl chloride/vinyl acetate/vinyl alcohol copolymer, polyurethane resin, cellulose resin, polyester resin or its sulfonated product, vinylidene chloride/acrylonitrile copolymer, acrylonitrile/butadiene copolymer, isoprene rubber or butadiene rubber are dispersed therein with or without any other additive such as a hardner (e.g. low molecular weight isocyanate compound). The resultant composition may be applied onto a substrate material by a per se conventional procedure such as coating, spraying or dipping to form a magnetic coating layer. On the application, any application aid such as a gravure roll coater, a reverse roll coater or a knife coater may be employed. Alternatively, a solution comprising the lubricant(s) and/or the unsaturated fatty acid ester(s) in a solvent or solvent mixture as prepared above may be applied onto the magnetic layer optionally containing the lubricant(s) or the unsaturated fatty acid ester(s) as previously formed on a substrate material by a per se conventional procedure as stated above. When desired, the thus formed magnetic layer may be subjected to super-calendering or polishing at the surface.

Practical and presently preferred embodiments of the invention are illustratively shown in the following Examples wherein part(s) are by weight unless otherwise indicated.

EXAMPLE 1

For preparation of a magnetic coating composition, the following materials were used:

| Composition | Part(s) |
| --- | --- |
| Co—containing gamma-$Fe_2O_3$ magnetic powder | 270 |
| "VAHG" (vinyl chloride/vinyl acetate/vinyl alcohol copolymer; manufactured by Union Carbide Corp.) | 80 |
| "N 1432J" (acrylonitrile-butadiene copolymer; manufactured by Nippon Zeon Co., Ltd.) | 15 |
| "Coronate L" (trifunctional low molecular weight polyisocyanate compound; manufactured by Nippon Polyurethane Co., Ltd.) | 10 |
| "HS-500" (carbon black; manufactured by Asahi Carbon K.K.) | 34 |
| Oleyl oleate | 19 |
| alpha-$Fe_2O_3$ powder | 11 |
| Methyl isobutyl ketone | 420 |
| Toluene | 420 |

The above materials were well mixed in a ball mill to prepare a magnetic coating composition. The coating composition was applied to both surfaces of a polyester base film of 75μ in thickness to form a magnetic layer having a thickness of about 3μ (after drying) on each surface. The thus formed magnetic layer was dipped in a solution of squalane (60 parts) in n-hexane (100 parts) as a lubricating solution for a short period of time (e.g. 60 seconds), dried and subjected to super-calendering, followed by punching into a round disk form to obtain a magnetic recording disc.

EXAMPLE 2

Preparation of a magnetic recording disc was carried out in the same manner as in Example 1 but using liquid paraffin (60 parts) instead of squalane as the lubricant in the lubricating solution.

EXAMPLE 3

Preparation of a magnetic recording disc was carried out in the same manner as in Example 1 but using n-butyl oleate (19 parts) instead of oleyl oleate as the unsaturated fatty acid ester in the magnetic coating composition.

EXAMPLE 4

Preparation of a magnetic recording disc was carried out in the same manner as in Example 1 but using the magnetic coating composition from which oleyl oleate was omitted and the lubricating solution comprising squalane (20 parts) and oleyl oleate (40 parts).

EXAMPLE 5

Preparation of a magnetic recording disc was carried out in the same manner as in Example 4 but using "Daifloil #20" (20 parts; trichloromonofluoroethylene; manufactured by Daikin Kogyo Co. Ltd.) instead of squalane as the lubricant in the lubricating solution.

EXAMPLE 6

Preparation of a magnetic recording disc was carried out in the same manner as in Example 5 but using dimethyl silicone oil (20 parts) instead of "Daifloil #20" as the lubricant in the lubricating solution.

COMPARATIVE EXAMPLE 1

Preparation of a magnetic recording disc was carried out in the same manner as in Example 1 but using the magnetic coating composition from which oleyl oleate was omitted.

COMPARATIVE EXAMPLE 2

Preparation of a magnetic recording disc was carried out in the same manner as in Example 5 but using the lubricating solution from which oleyl oleate was omitted and in which the amount of "Daifloil #20" was increased to 60 parts.

COMPARATIVE EXAMPLE 3

Preparation of a magnetic recording disc was carried out in the same manner as in Example 6 but using the lubricating solution from which oleyl oleate was omitted and in which the amount of dimethyl silicone oil was increased to 60 parts.

COMPARATIVE EXAMPLE 4

Preparation of a magnetic recording disc was carried out in the same manner as in Example 1 but omitting squalane from the lubricating solution.

COMPARATIVE EXAMPLE 5

Preparation of a magnetic recording disc was carried out in the same manner as in Example 5 but using the lubricating solution from which "Daifloil #20" was omitted and oleyl oleate was increased to 60 parts.

COMPARATIVE EXAMPLE 6

Preparation of a magnetic recording disc was carried out in the same manner as in Example 1 but using n-butyl stearate instead of oleyl oleate in the magnetic coating composition and liquid paraffin instead of squalane in the lubricating solution.

Every ten samples of the magnetic recording discs obtained in each of Examples 1 to 6 and Comparative Examples 1 to 6 were each placed into a jacket for dust prevention and then inserted respectively into ten recording-reproducing apparatuses for testing the durability. Measurement was made on the running time on each recording-reproducing apparatus until the the reproducing output decreased to 50% of the initial output when the running was carried out under the contact of the magnetic recording head with a pad pressure being 25 g/cm$^2$ and a circumferential speed of 10 m/sec. The shortest running time and the rate of the apparatuses affording the running time of more than 50 hours were determined on 10 apparatuses. Also, the staining of the pad when the reproducing output reached to 50% of the initial output was observed.

The results are shown in Table 1.

TABLE 1

| Example | Shortest running time (hr) | Rate of apparatuses affording more than 50 hours in running (%) | Staining of pad |
| --- | --- | --- | --- |

TABLE 1-continued

| | Shortest running time (hr) | Rate of apparatuses affording more than 50 hours in running (%) | Staining of pad |
|---|---|---|---|
| 1 | 102 | 100 | None |
| 2 | 83 | 100 | None |
| 3 | 72 | 100 | None |
| 4 | 100 | 100 | None |
| 5 | 92 | 100 | None |
| 6 | 94 | 100 | None |
| Comparative | | | |
| 1 | 30 | 70 | Observed |
| 2 | 25 | 70 | Observed |
| 3 | 22 | 70 | Observed |
| 4 | 20 | 80 | None |
| 5 | 20 | 80 | None |
| 6 | 60 | 80 | Observed |

As can be seen in Table 1, the magnetic recording discs of the invention (Examples 1 to 6) are longer in shortest running time than conventional magnetic recording discs. Further, they provide 100% in the rate of the apparatuses affording more than 50 hours of running without variation. Furthermore, none of them show any pad staining. Accordingly, it may be said that the magnetic recording discs of the invention are excellent in durability and have increased reliability.

What is claimed is:

1. A magnetic recording disc which comprises a disc substrate and a magnetic layer comprising magnetic powder and a resinous binder formed on the substrate, characterized in that the magnetic layer further comprises at least one lubricant chosen from hydrocarbons, fluorinated compounds and silicone compounds and at least one unsaturated fatty acid ester chosen from oleyl oleate and n-butyl oleate, the combined amount of the lubricant and the unsaturated fatty acid ester being from 0.1 to 40% by weight to the amount of the magnetic powder.

2. The magnetic recording medium according to claim 1, wherein the weight ratio of the lubricant and the unsaturated fatty acid ester is from 99:1 to 1:99.

3. The magnetic recording medium according to claim 1, wherein the lubricant is a hydrocarbon.

4. The magnetic recording medium according to claim 3, wherein the lubricant is a hydrocarbon chosen from liquid paraffin, natural squalane, natural squalene, synthetic squalane, synthetic squalene and olefin polymerized oil.

5. The magnetic recording medium according to claim 1, wherein the lubricant is a fluorinated compound.

6. The magnetic recording medium according to claim 5, wherein the fluorinated compound is the one chosen from tetrafluoroethylene, hexafluoropropylene, trichlorofluoroethylene, perfluoroalkyl polyether and fluorinated alkyl ester.

7. The magnetic recording medium according to claim 1, wherein the lubricant is a silicone compound.

8. The magnetic recording medium according to claim 7, wherein the silicone compound is the one chosen from dimethyl silicone oil, methyl phenyl silicone oil and fluorinated silicone oil.

9. The magnetic recording disc according to claim 1, wherein the magnetic layer is provided on each side of the substrate.

10. The magnetic recording disc according to claim 1, wherein the magnetic layer is prepared by a process which includes the steps of mixing the magnetic powder, the resinous binder and the unsaturated fatty acid ester, applying the mixture to said substrate and drying the magnetic layer.

11. The magnetic recording disc according to claim 1, wherein the magnetic layer is prepared by a process which includes the steps of mixing the magnetic powder, the resinous binder, the unsaturated fatty acid ester and a solvent, applying the mixture to said substrate to form a layer, applying the lubricant to the layer and drying the layer.

12. A magnetic recording disc which comprises a disc substrate and a magnetic layer formed on said substrate, said magnetic layer consisting essentially of a mixture of magnetic powder, a resinous binder and 0.1 to 40% by weight based on the amount of the magnetic powder of at least one unsaturated fatty acid ester chosen from oleyl oleate and n-butyl oleate and at least one lubricant chosen from hydrocarbons, fluorinated compounds and silicone compounds wherein the weight ratio of the lubricant and the unsaturated fatty acid ester is from 99:1 to 1:99.

* * * * *